United States Patent
Weyerhaeuser et al.

(10) Patent No.: US 9,846,724 B2
(45) Date of Patent: Dec. 19, 2017

(54) INTEGRATION OF CALCULATION MODELS INTO SQL LAYER

(71) Applicants: Christoph Weyerhaeuser, Heidelberg (DE); Tobias Mindnich, Walldorf (DE); Johannes Merx, Heidelberg (DE); Yongsik Yoon, Walldorf (DE); Sung Heun Wi, Gyeonggi-do (KR); Jeong Ae Han, Seoul (KR)

(72) Inventors: Christoph Weyerhaeuser, Heidelberg (DE); Tobias Mindnich, Walldorf (DE); Johannes Merx, Heidelberg (DE); Yongsik Yoon, Walldorf (DE); Sung Heun Wi, Gyeonggi-do (KR); Jeong Ae Han, Seoul (KR)

(73) Assignee: SAP SE, Walldorf (DE)

( * ) Notice: Subject to any disclaimer, the term of this patent is extended or adjusted under 35 U.S.C. 154(b) by 377 days.

(21) Appl. No.: 14/540,792

(22) Filed: Nov. 13, 2014

(65) Prior Publication Data

US 2016/0140175 A1 May 19, 2016

(51) Int. Cl.
*G06F 17/30* (2006.01)
(52) U.S. Cl.
CPC .............................. *G06F 17/30463* (2013.01)
(58) Field of Classification Search
CPC ................................................ G06F 17/30463
USPC ......................................................... 707/718
See application file for complete search history.

(56) References Cited

U.S. PATENT DOCUMENTS

| | | | | |
|---|---|---|---|---|
| 5,918,232 A | * | 6/1999 | Pouschine | G06F 17/30592 |
| 5,963,936 A | * | 10/1999 | Cochrane | G06F 17/30454 |
| 6,092,062 A | * | 7/2000 | Lohman | G06F 17/30463 |
| 9,292,574 B2 | * | 3/2016 | Hsiao | G06F 17/30442 |
| 2005/0010565 A1 | * | 1/2005 | Cushing | G06F 17/30392 |
| 2005/0010569 A1 | * | 1/2005 | Styles | G06F 17/2247 |
| 2006/0106776 A1 | * | 5/2006 | Dettinger | G06F 17/30398 |
| 2007/0226186 A1 | * | 9/2007 | Ewen | G06F 17/30463 |
| 2009/0006346 A1 | * | 1/2009 | C N | G06F 17/30454 |

(Continued)

FOREIGN PATENT DOCUMENTS

WO WO 2009005594 A3 * 6/2009 ........ G06F 17/30454

OTHER PUBLICATIONS

Stackoverflow (a computer programmers' discussion forum), article "Converting Directed Acyclic Graph(DAG) to tree". Published date Jun. 18, 2011.*

(Continued)

*Primary Examiner* — Ashish K Thomas
*Assistant Examiner* — Abdullah Daud
(74) *Attorney, Agent, or Firm* — Brake Hughes Bellermann LLP (57) ABSTRACT

According to an aspect, a database system for integrating calculation models into execution plans includes a first engine configured to parse a query to be applied on a database. The first engine is configured to invoke a second engine during query compilation. The second engine is configured to instantiate a calculation model based on the query, and the second engine is configured to derive a converted calculation model by converting the calculation model into a format compatible with the first engine. The first engine is configured to incorporate the converted calculation model into an execution plan during the query compilation and execute the query on the database according to execution plan.

18 Claims, 4 Drawing Sheets

(56) References Cited

U.S. PATENT DOCUMENTS

| | | | |
|---|---|---|---|
| 2009/0077001 A1* | 3/2009 | Macready | G06N 5/02 706/57 |
| 2012/0005190 A1* | 1/2012 | Faerber | G06F 17/30404 707/718 |
| 2012/0109934 A1* | 5/2012 | Weyerhaeuser | G06F 17/30463 707/713 |
| 2012/0130942 A1* | 5/2012 | Dipper | G06F 17/30436 707/602 |
| 2012/0191690 A1* | 7/2012 | George | G06F 17/30471 707/708 |
| 2015/0142777 A1* | 5/2015 | Mindnich | G06F 17/30424 707/722 |
| 2015/0370865 A1* | 12/2015 | Song | G06F 17/30554 707/694 |
| 2016/0034530 A1* | 2/2016 | Nguyen | G06F 17/30442 707/719 |

OTHER PUBLICATIONS

Wikipedia (an online knowledgebase), article "Query Optimization".*

* cited by examiner

INTEGRATION OF CALCULATION MODELS INTO SQL LAYER

BACKGROUND

A database system may include a relational database and multiple engines that are used to query the relational database. For example, the engines may include a structured query language (SQL) engine configured to query the relational database using standard SQL, and a calculation engine configured to query the relational database based on a calculation model. There may be benefits for using one type of engine over another type of engine. For example, the calculation model is a solution to express complex data flows and calculations within the database system. The calculation model is expressed in a format that allows non-relational operations and/or relatively more complex operations that are generally not possible with standard SQL. However, the SQL engine may be better suited for other types of operations such as join re-ordering or other relational operations. Both the calculation engine and the SQL engine are associated with their own optimizer. For example, the calculation engine's optimizer may be focused on filter push down, filter combination, attribute removal, etc., while the SQL engine's optimizer may be focused on relational optimizations.

Conventionally, the calculation models are not integrated with the execution model of the SQL optimizer. For example, if the query relates to a join involving a row store view and a calculation view, the SQL engine parses, compiles, and executes the SQL query for the row store view. After execution of the row store query, the query engine instantiates, optimizes, and then executes the calculation model for the calculation view, which is then combined with the row store view.

SUMMARY

According to an aspect, a database system for integrating calculation models into execution plans includes a first engine configured to parse a query to be applied on a database. The first engine is configured to invoke a second engine during query compilation. The second engine is configured to instantiate a calculation model based on the query, and the second engine is configured to derive a converted calculation model by converting the calculation model into a format compatible with the first engine. The first engine is configured to incorporate the converted calculation model into an execution plan during the query compilation and execute the query on the database according to execution plan.

In some examples, the database system may include one or more of the following features (or any combination thereof). The first engine is a structured query language (SQL) engine, and the second engine is a calculation engine. The second engine is configured to instantiate the calculation model by merging the query with the calculation model and removing one or more attributes from the calculation model that are not required by the query. The format of the calculation is a directed acyclic graph (DAG) having an arrangement of operator nodes. The format compatible with the first engine is a Query Optimization (QO)-Graph such that the DAG of the calculation model is converted into the QO-Graph. The first engine is configured to invoke the second engine during query compilation if the calculation model is convertible to the format associated with the first engine. The first engine is configured to determine whether the calculation model is fully relational, and if the calculation model is fully relational, the first engine is configured to invoke the second engine. The execution plan includes a structured query language (SQL) model integrated with the converted calculation model that produces a merged structure. Before converting, the format of the calculation model is not compatible with the format of the first engine. The query specifies a calculation view that incorporates an attribute view, and the first engine is configured to determine a structured query language (SQL) model for the attribute view, and invoke the second engine to determine the calculation model for the calculation view, where the execution plan integrates the SQL model and the converted calculation model into a merged structure.

According to an aspect, a computer program product tangibly embodied on a non-transitory computer-readable storage medium and including executable code that, when executed, is configured to cause at least one processor to parse, by a structured query language (SQL) engine, a query to be executed on a relational database, invoke, by the SQL engine, a calculation engine to obtain a calculation model, convert, by the calculation engine, a format of the calculation model to a format compatible with the SQL engine, incorporate, by the SQL engine, the calculation model with the converted format into an execution plan, and execute, by the SQL engine, the query on the relational database according to the execution plan incorporated with the calculation model.

In some examples, the computer program product may include one or more of the following features (or any combination thereof). The executable code includes instructions that, when executed by the at least one processor, are configured to instantiate, by the calculation engine, the calculation model by merging the query with the calculation model and removing one or more attributes from the calculation model that are not required by the query, and optimize, by the calculation engine, the calculation model, where the optimized calculation model is converted to the format compatible with the SQL engine. The executable code to convert the format of the calculation model includes instructions to convert a directed acyclic graph (DAG) to a QO-Graph, where the QO-Graph is incorporated into the execution plan to produce a merged QO-SQL structure. The calculation model includes an arrangement of operator nodes, and the calculation engine is not invoked for converting the calculation model if any of the operator nodes is non-relational but instantiates, optimizes and executes the calculation model. The calculation engine is invoked during SQL query compilation such that the SQL engine incorporates the calculation model before SQL execution. The executable code includes instructions that, when executed by the at least one processor, are configured to optimize, by the SQL engine, the execution plan with the integrated calculation model.

According to an aspect, a method for integrating calculation models into execution plans includes parsing, by a structured query language (SQL) engine, a query to be executed on a relational database, where the query requires a calculation model and an SQL model, determining, by the SQL engine, whether the calculation model is convertible into a format compatible with the SQL engine, invoking, by the SQL engine, a calculation engine to obtain the calculation model if the calculation model is determined as convertible, converting, by the calculation engine, the calculation model to the format compatible with the SQL engine, integrating, by the SQL engine, the calculation model and the SQL model into an execution plan, optimizing, by the SQL engine, the execution plan, and executing, by the SQL engine, the query on the relational database according to the execution plan.

In some examples, the method may include one or more of the following features (or any combination thereof). The method may include executing, by the SQL engine, the SQL model to obtain first results if the calculation model is not convertible into the format compatible with the SQL engine, executing, by the calculation engine, the calculation model to obtain second results, and returning, by the SQL engine, the first and second results in a manner specified by the query. The calculation model is determined as not convertible into the format compatible with the SQL engine if at least one operator node of a directed acyclic graph (DAG) is not relational. The calculation model provides a graphical calculation view that incorporates at least one an attribute or analytical view.

The details of one or more implementations are set forth in the accompanying drawings and the description below. Other features will be apparent from the description and drawings, and from the claims.

DETAILED DESCRIPTION

The embodiments provide systems and methods for integrating a calculation model into the SQL execution plan such that further optimization can be applied on the combined execution plan. Typically, the calculation model includes operators that are not compatible to the SQL's execution model. However, according to the embodiments, during SQL query compilation, the calculation model is instantiated, optimized, and then converted to a format compatible to the SQL's execution model such that the SQL optimizer can understand the converted calculation model. For instance, from the view point of the SQL optimizer, the non-converted calculation model is seen as a black box. However, after converting the calculation model, the converted calculation model may be inserted into the overall execution model during query compilation, and then further optimized by the SQL optimizer. Then, the single, combined execution plan may be executed. As a result, it is possible to have all (or substantially all) optimizations moved from execution time to compilation time of the query, which may improve the overall execution time of prepared statements. Additionally, further optimizations may be applied to the combined execution plan in a manner that previously was not possible. Further, it is possible to store the combined execution plan into a plan cache such that it may be reused for subsequent, similar queries.

Figure 1:
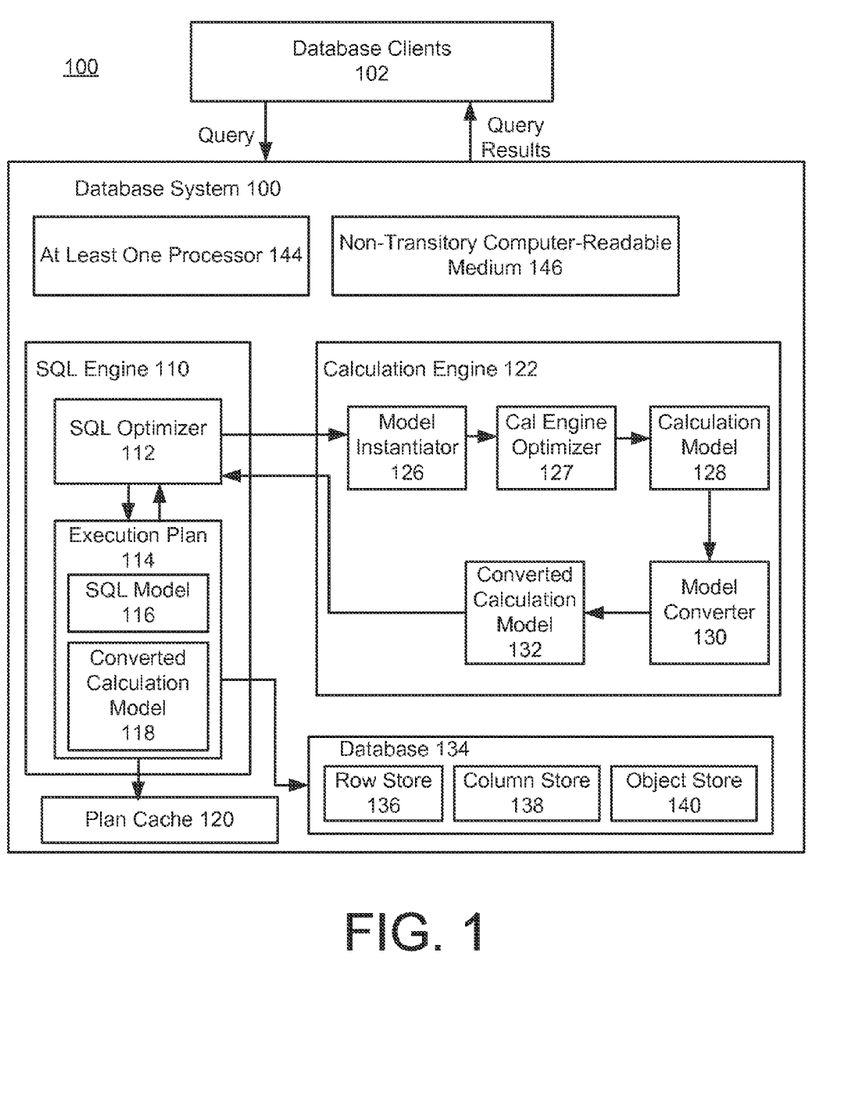
FIG. 1 illustrates a database system for converting and integrating a calculation model into a SQL execution plan during query compilation according to an aspect.

FIG. 1 illustrates a database system 100 including a calculation engine 122 for instantiating, optimizing, and then converting a calculation model 128 into a format compatible with an SQL optimizer 112 during query compilation, and an SQL engine 110 for integrating the converted calculation model 132 into an execution plan 114, applying further optimizations on the execution plan 114, and then executing the query on a database 134 according to the execution plan 114. As a result, the efficiency and speed for query execution may be improved.

The database system 100 may be a relational database management system (RDBMS). In some examples, the database system 100 is an in-memory database or in-memory database system. The in-memory database system is a type of a relational database management system (RDBMS) that relies on main memory for computer data storage. In contrast, conventional database systems employ a disk storage mechanism. In some examples, the in-memory database system includes a combination of main memory and disk storage. Also, the in-memory database system may support real-time analytics and transactional processing including replication and aggregation techniques. Also, within the in-memory database environment, query/calculation logic is pushed down into the database layer (as opposed to remaining in the application layer) such that the processing time for querying and manipulating the data within the database 134 may be reduced as compared with conventional relational database systems. In some examples, the in-memory database system may be HANA Enterprise 1.0 (any other versions) that is developed by SAP. However, the techniques described herein may be applied to any type of relational database system.

The database system 100 operates in conjunction with Structured Query Language (SQL). Generally, SQL refers to a special-purpose programming language designed for managing data held in a relational database management system including an in-memory database. SQL may refer to various types of data related languages including, e.g., a data definition language and a data manipulation language, where a scope of SQL may include data insert, query, update and delete, schema creation and modification, and data access control, and SQL may include procedural elements. Further, in some examples, SQL may include descriptions related to various language elements, including clauses, expressions, predicates, queries, and statements. For instance, clauses may refer to various constituent components of statements and queries, and in some instances, clauses may be considered optional. Further, expressions may be configured to produce scalar values and/or tables that include columns and/or rows of data. Also, predicates may be configured to specify conditions that may be evaluated to SQL three-valued logic (3VL) (true/false/unknown) and/or Boolean truth values, which may be used to moderate effects of statements and queries, and which may be used to modify program flow.

The queries are requests to view, access, and/or manipulate data stored in the database 134. The queries may be received at the database system 100 from the database clients 102 in the SQL format (e.g., referred to as SQL queries). Generally, a query is a request for information from the database 134, and the query results may be generated by accessing relevant data from the database 134, and manipulating the relevant data to yield requested information. The database 134 may include one or more database structures or formats such as a row store 136, column store 138, and object store 140. The database structures may be considered complex, where desired data for the query may be retrieved from the database 134 by accessing data using different ways, with different data structures (e.g., SQL models 116, calculation models 128), and in different orders, which typically affects processing times. For instance, processing times of the same queries may vary depending on the manner in which the data is retrieved and/or selected from the database 134. It is noted that the techniques described herein may be applied regardless of the storage format of the database 134. For instance, the techniques described herein may be applied to the row store 136, the column store 138, or the object store 140, or any combinations thereof.

The database system 100 may include multiple engines for processing queries to be executed on the database 134, and returning the query results (e.g., views) to the database clients 102. The database clients 102 may include any type of device or application configured to interface with the database system 100. In some examples, the database clients 102 include one or more application servers. The database system 100 may include the SQL engine 110 and the calculation engine 122.

The SQL engine 110 may include one or more engines that process queries using SQL. The SQL engine 110 may execute queries according to an SQL model 116 which may be the execution plan 114 or apart of the execution plan 114 if combined with other query models or plans. Typically, the SQL engine 110 may process queries (or portions of queries) that require relational operators such as joins, unions, intersections, differences, selections, projections, joins, and sorting, etc. The SQL model 116 may be a query plan or query scenario for querying the database 134. The SQL model 116 may include a collection of operators designed to accomplish the functions related to the query. The SQL model 116 may include an arrangement of operator nodes that encapsulate relational operations for executing the query. The operator nodes may be arranged in a tree structure, where results flow from a lower portion of the tree to an upper portion of the tree. Each operator node may include zero or more child nodes, where output from the child nodes are fed as input to related parent nodes. For instance, a join node may include two child nodes that may represent two join operands, whereas a sort node may include a single child node with the input for sorting. Leaves of the tree may include operator nodes that produce results by scanning tables, including performing index scans and/or sequential scans.

The SQL engine 110 is used to process one or more SQL models 116, which may correspond to views such as attribute or analytical views. For example, the SQL engine 110 may include a join engine and/or online analytical processing (OLAP) engine. The join engine may be used to perform all types of joins. In some examples, the join engine may process the SQL models 116 to obtain attribute views. The attribute views are used to define joins between tables. Also, they can be used to select a subset of columns and rows from a table. In one specific example, an attribute view "Flight" can show Airline Code, Airline Connection Number, and flight date into one object.

The OLAP engine may be used for calculation and aggregation. In some examples, the OLAP engine may process the query to obtain analytical views. The analytical views are typically defined on at least one fact table that contains transactional data. Using analytic views, one can create a selection of measures, add attributes and join attribute views. The SQL engine 110 is associated with an SQL optimizer 112 configured to perform one or more optimizations on the SQL model 116. The SQL optimizer 112 may perform any type of SQL optimization procedures known to one of ordinary skill in the art.

During query execution process, the SQL engine 110 (including the SQL optimizer 112) is configured to receive, parse, compile, and optimize the query to obtain the SQL model 116 (or multiple SQL models). During the compilation and/or optimization steps, the SQL engine 110 determines which operations must be conducted to accomplish the query such as obtaining the parsing tree from the query, converting to an initial query plan, selecting an order for joins, and/or physical plan selection that represents the query plan as the query tree having a series of relational operators. The SQL engine 110 may be configured to incorporate other query plans (e.g., SQL models 116, calculation models 128) into the overall execution plan 114. Then, the SQL engine 110 is configured to execute the execution plan 114 on the database 134 to obtain the data relevant to the query.

However, during the compilation process, the SQL engine 110 determines whether the query, the execution plan 114, and/or the SQL model 116 requires one or more calculation models 128, calculation views or operations handled by the calculation engine 122. If so, the SQL optimizer 112 may invoke the calculation engine 122, which instantiates, optimizes, and then converts the calculation model 128 into the converted calculation model 132 having the compatible format. Then, the SQL optimizer 112 incorporates the converted calculation model 132 into the execution plan 114, and performs one or more additional optimizations on the combined execution plan 114. Then, the SQL optimizer 112 executes the query according to the execution plan 114. It is noted that the converted calculation model 132 is from the same structure as the SQL model 116, but the SQL model 116 originates directly from a SQL statement and the converted calculation model 132 originates from a SQL query on a calculation model 128 which is then instantiated, optimized, and converted into such a SQL model.

The calculation engine 122 executes queries based on calculation models 128. In some examples, the calculation engine 122 is used for complex calculations that cannot be accomplished by the SQL engine 110. The calculation engine 122 may execute the calculation models 128 to obtain the calculation views. Also, the calculation engine 122 may execute a series of calculation models 128 that may be joined or stacked to produce multiple calculation views. The calculation views may be graphical views that consume other analytical, attribute, and/or calculation views and tables. The calculation views may include union, join, projection, and aggregation nodes (or any combination thereof), and provides enhanced features such as distinct, count, calculation, and dynamic joints.

In some examples, the calculation model 128 is a generic query model that provides the framework for querying data in the database 134 in an efficient manner. Similar to the SQL model 116, the calculation model 128 specifies one or more operator nodes that encapsulate operations for executing the query, and the operator nodes may be arranged in a tree structure, where results flow from a lower portion of the tree to an upper portion of the tree. However, the calculation model 128 may specify relatively more complex operations on the data in order to provide one or more calculation views. The calculation model 128 may include custom calculation flows that provide enhanced functionality in contrast to standard SQL implemented by the SQL engine 110

In some examples, the calculation model 128 is a directed acyclic graph (DAG) that expresses complex data flows and calculations within the database 134. In some examples, the calculation model 128 includes at least one non-relational operator node that performs a non-relational function. In other examples, the calculation model 128 includes all relational operators. A relational operator (expressed by relational expressions or relational conditions) may be a programming language construct or operator that defines a relation between two entities. There may be many different types of relational operators. In some examples, the relational operators may be joins, unions, intersections, differences, selections, projections, joins, and sorting, etc. Non-relational operators may be any type of operator not considered relational. In some examples, non-relational operators may include non-relational comparisons, custom expressions, join conditions that do not follow primary/foreign key model, type constructor, field extractor, nest block, unnest block, etc.

Before conversion, the calculation model 128 is within a format that is not compatible with the SQL engine 110. For example, the calculation model 128 in the DAG format is not compatible with the SQL engine 110. As such, if the query specifies a non-calculation view (e.g., analytic view, attribute view, etc.) joined with the calculation view (or the calculation view requires one or more analytic or attribute views), the SQL engine 110 process and executes (and optionally optimizes) the SQL model 116 for the non-calculation view. Then, the calculation engine 122 processes, optimizes, and then executes the calculation model 128 for the calculation view to obtain intermediate results. The SQL engine 110 may combine the intermediate results of the calculation model 128 with the results of the SQL model 116 in order to complete the query.

However, the database system 100 changes this query execution process by incorporating the converted calculation model 132 into the SQL execution plan 114 during query compilation (instead of after execution). As a result, the SQL engine 110 may apply further optimizations to the combined execution plan 114 in a manner that previously was not possible. Further, it is possible to store the combined execution plan 114 into the plan cache 120 such that the execution plan 114 can be reused for subsequent, similar queries.

If the calculation model 128 is convertible, the SQL optimizer 112 calls the calculation engine 122 during compilation time of the query. If one or more operator nodes of the calculation model 128 are non-relational, the SQL engine 110 determines that the calculation model 128 cannot be converted. In this case, the SQL engine 110 may proceed as indicated above. For example, SQL execution is performed followed by calculation model execution (or vice versa). Then, the SQL engine 110 may combine the intermediate results from the calculation model 128 with the results of the SQL model 116 in order to complete the query. However, if all of the operator nodes of the calculation model 128 are relational, the SQL optimizer 112 determines that the calculation model 128 can be converted. If the calculation model 128 is convertible, the SQL optimizer 112 may invoke the calculation engine 122, as discussed below.

The calculation engine 122 may include a model instantiator 126, a calculation engine optimizer 127, and a model converter 132, which instantiates, optimizes, and converts, during SQL query compilation, the calculation model 128 to the converted calculation model 132 having the format that is compatible with the SQL engine 110 and/or SQL optimizer 112. The converted calculation model 132 is returned to the SQL optimizer 112. Then, the SQL optimizer 112 combines, integrates, or merges the converted calculation model 132 with other converted calculation models 132 and/or SQL model(s) 116, thereby producing the overall execution plan 114 having the merged structure.

The model instantiator 126 may instantiate the calculation model 128 by obtaining or deriving the calculation model 128, and merging the query for the calculation view with the calculation model 128. The model instantiator 126 may obtain one or more calculation models 128 from the database 134. For example, the model instantiator 126 may obtain the calculation model 128 from the database 134, which stores a number of different calculation models 128 by selecting the calculation model 128 (or more than one calculation model 128) that generally corresponds to the type of operations specified by the query. In other examples, the model instantiator 126 may create or derive the calculation model 128 on the fly.

The calculation engine optimizer 127 may tailor the calculation model 128 (which may be relatively generic) to the requested query and optimize the calculation model 128 to be executed in an efficient manner. For example, the calculation engine optimizer 127 may combine multiple filters, push down filters, remove filter attributes, and/or remove unnecessary attributes from the calculation model 128. If an attribute is not required by the calculation view and is not required by other parts of the calculation model 128, the calculation engine optimizer 127 may remove that attribute from the calculation model 128.

Before converting, the calculation model 128 is a format different than the format recognizable by the SQL engine 110 and/or SQL optimizer 112. For example, from the point of view of the SQL engine 110, the calculation model 128 is a black box. In other words, the SQL engine 110 may not understand the logic behind the calculation model 128. The DAG format is not compatible with the SQL engine 110. However, the model converter 130 is configured to convert the format of the calculation model 128 to the format compatible with the SQL engine 110, thereby producing the converted calculation model 132. In some examples, the model converter 130 is configured to convert the format of the calculation model 128 to a QO-graph. In some examples, the QO-graph is considered a query optimizer graph. The QO-graph is the format of the SQL model 116. In some examples, the SQL engine 110 can only consume QO-graphs.

With respect to the conversion process, the calculation model 128 includes several operator nodes, e.g., join, union, aggregation, etc. All relational operations of the calculation model 128 have a corresponding equivalent in the QO-graph format. In some examples, the model converter 130 is required to convert an operator node of the calculation model 128 into several QO-graph nodes since the QO-graph nodes are more fine granular, which means they can only perform one operation whereas for example the calculation engine's aggregation operator node could project attributes, aggregate attributes and filter on them in a single node. Most of calculation engine's operator nodes can project, filter, and add calculated attributes besides the real operation. Thus, in some examples, the model converter 130 performs the conversion process to create, for each calculation engine's operation node, 1 to N QO-graph nodes.

The calculation engine 122 provides the converted calculation model 132 to the SQL optimizer 112. During query compilation, the SQL optimizer 112 integrates the converted calculation model 132 into the overall execution plan 114. In some examples, the SQL optimizer 112 joins the converted calculation model 132 with other query plans such as the SQL model 116. For instance, the SQL optimizer 112 incorporates the converted calculation model 132 into the execution plan 114, and performs one or more additional optimizations on the combined execution plan 114. For example, the calculation engine optimizer 127 cannot reorder join operator nodes, whereas the SQL optimizer 112 can reorder join operator nodes. A pure calculation engine execution would execute the join operations in the order as they are defined in the calculation model 128. The SQL optimizer 112 may change this execution order to reduce the runtime of the query. Further, the calculation engine optimizer 127 cannot push down aggregation, therefore an aggregation operation is executed on the level where the aggregation is defined. However, the SQL optimizer 112 may push down an aggregation operator through a join operator (or another operator). In some examples, a join engine or OLAP engine view is a black box for the calculation engine optimizer 127, but not for the SQL optimizer 112. As such, this allows further optimization by the SQL optimizer 112 such as pushing a filter into the main part of such a view. Accordingly, with the merged structure, the SQL optimizer 112 may perform these types of optimizations on the combined plan in a manner that was not possible before because the calculation model 128 was separately optimized. Then, the SQL optimizer 112 executes the execution plan 114 having the converted calculation model 128 within the context of a larger query plan that includes the SQL model 116.

The database system 100 (all components of the database system 100) are implemented at the database level (database server). In this case, the database system 100 is implemented as the in-memory database system. If an application solution is implemented with a three tier solution (e.g., interface, application server, and database), the components of the database system 100 are implemented in the database level as opposed to the application server or the interface (web interface). As such, the database clients 102 (e.g., application servers, web applications, etc.) may interact with the database system 100 by submitting queries and receiving query results. In other examples, the components of the database system 100 are implemented as part of a relational database system such that these components may be distributed across multiple devices or layers or included within a single device or layer.

The database system 100 may include at least one processor 144, and a non-transitory computer-readable medium 146 storing executable code that, when executed by the at least one processor 144, is configured to implement the components and functionalities of the database system 100. The non-transitory computer-readable medium 146 may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. Also, the non-transitory computer-readable medium 146 may include any devices configured as main memory and/or disk storage. The at least one processor 144 may include any type of general purpose computing circuitry or special purpose logic circuitry, e.g., an FPGA (field programmable gate array) or an ASIC (application specific integrated circuit). Also, the at least one processor 144 may be one or more processors coupled to one or more semi-conductor substrates.

Figure 2:
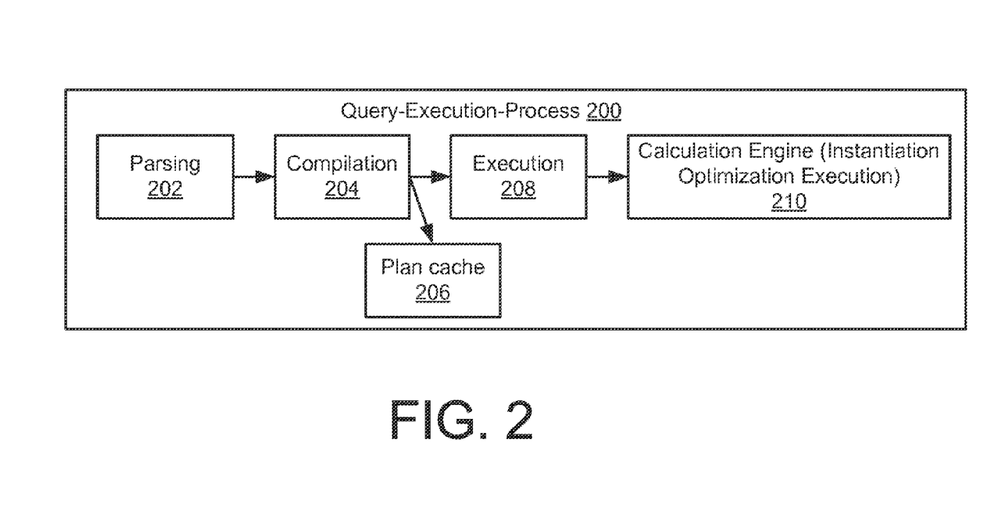
FIG. 2 illustrates a query execution process that is performed when the calculation model is not convertible according to an aspect.

FIG. 2 illustrates a query execution process 200 that is performed when the SQL optimizer 112 determines that the calculation model 128 is not convertible for the requested query according to an aspect. For example, in operation 202, the SQL engine 110 parses the query. In operation 204, the SQL engine 110 and/or SQL optimizer 112 compiles (and potentially optimizes) the parsed query to determine the execution plan 114 which may be implemented with one or more SQL models 116 and/or one or more calculation models 128 (which is dependent upon the complexity of the query). In operation 206, the execution plan 114 may be stored in the plan cache 120 for subsequent, similar queries. Also, at this time, the SQL optimizer 112 may determine that the calculation model 128 required by the query is not convertible into the format associated with the SQL optimizer 112. In operation 208, the SQL engine 110 executes the SQL model 116 for the non-calculation view. After execution of the SQL model 116, the calculation engine 122 instantiates, optimizes, and then executes the calculation model 128 for the calculation view to obtain intermediate results. Then, the SQL engine 110 combines the intermediate results of the calculation model 128 with the results of the SQL model 116 in order to complete the query.

Figure 3:
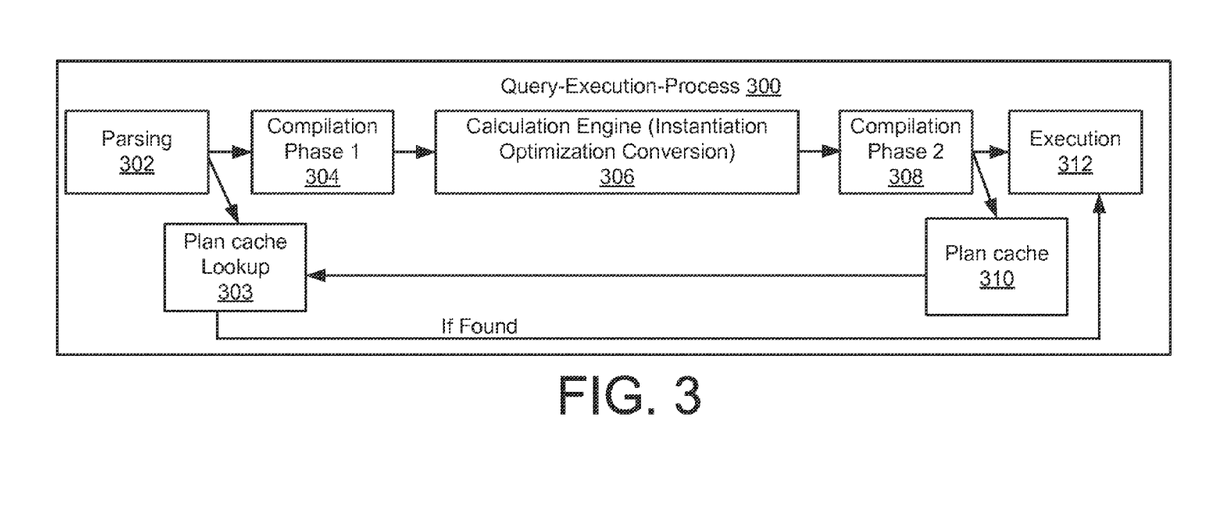
FIG. 3 illustrates a query execution process that is performed when the calculation model is convertible according to an aspect.

FIG. 3 illustrates a query execution process 300 that is performed when the SQL optimizer 112 determines that the calculation model 128 is convertible according to an aspect. In operation 302, the SQL engine 110 parses the query. In some examples, if the query is executed a second or $n^{th}$ time (assuming the database system 100 was not restarted or the plan cache 120 cleared in the time between), in operation 303, the SQL engine 110 may perform a plan cache lookup on the plan cache 120 to determine whether there is an already-existing execution plan 114. If so, the SQL engine 110 executes the execution plan 114 (operation 312). However, if an existing execution plan 114 is not stored in the plan cache 120, in operation 304, the SQL engine 110 performs first compilation operations on the parsed query to determine the general plan which may be implemented with one or more SQL models 116 and/or one or more calculation models 128 (which is dependent upon the complexity of the query). For instance, during the first compilation operations, the SQL optimizer 112 may determine if calculation models 128 are required by the query. Then, during query compilation, the SQL optimizer 112 may request the converted calculation model(s) 132 from the calculation engine 122 pertaining to the query so that they can be merged into the overall execution plan 114 which may contain one or more SQL models 116.

The model instantiator 126 may instantiate the calculation model 128 by obtaining or deriving the calculation model 128, and merging the query statements with the calculation model 128. The calculation engine optimizer 127 may tailor the calculation model 128 (which may be relatively generic) to the requested calculation view and optimize the calculation model 128 to be executed in an efficient manner. For example, the calculation engine optimize 127 may combine multiple filters, push down the filter within the calculation model 128, and/or remove unnecessary attributes from the calculation model 128. The model converter 130 converts the calculation model 128 to the format compatible with the SQL engine 110, thereby producing the converted calculation model 132. The model converter 130 may be configured to convert the format of the calculation model 128 to the QO-graph. Then, the calculation engine 122 is configured to provide the converted calculation model 132 to the SQL optimizer 112.

In operation 308, during second compilation operations, the SQL optimizer 112 integrates the converted calculation model 132 into the overall execution plan 114. The SQL optimizer 112 may join the converted calculation model 132 with other query plans such as other converted calculation models 132 and one or more SQL models 116. The SQL optimizer 112 may perform one or more additional optimizations on the combined execution plan 114. In operation 310, the SQL optimizer 112 stores the combined execution plan 114 in the plan cache 120 to be available for subsequent, similar query. In operation 312, the SQL optimizer 112 executes the execution plan 114, and obtains the appropriate query results based on the retrieved information from the database 134.

Figure 4:
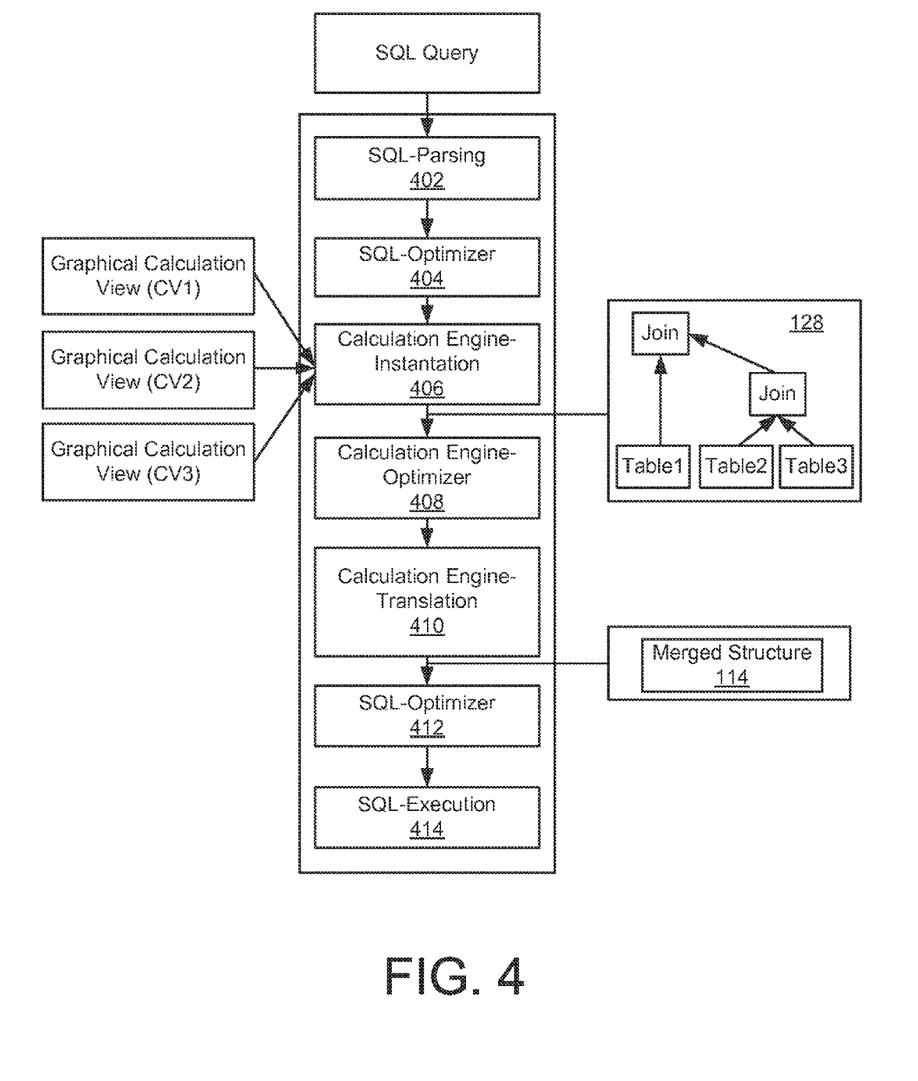
FIG. 4 is a flowchart illustrating example operations of the database system of FIG. 1 according to an aspect.

FIG. 4 is a flowchart illustrating example operations of the database system 100 according to an aspect. Although FIG. 4 is illustrated as a sequential, ordered listing of operations, it will be appreciated that some or all of the operations may occur in a different order, or in parallel, or iteratively, or may overlap in time.

In operation 402, the SQL engine 110 parses the SQL query. In operation 404, the SQL optimizer 112 compiles (and potentially optimizes) the parsed query. The SQL optimizer 112 may request the converted calculation model(s) 132 from the calculation engine 122 so that they can be merged into the overall execution plan 114 which may contain one or more SQL models 116. In operation 406, the model instantiator 126 may instantiate the calculation model 128 by obtaining or deriving the calculation model 128, and merging the query statements pertaining to the calculation views (CV1, CV2, CV3) with the calculation model 128.

In operation 408, the calculation engine optimizer 127 may tailor the calculation model 128 (which may be relatively generic) to the requested calculation views and optimize the calculation model 128 to be executed in an efficient manner. For example, the calculation engine optimize 127 may combine multiple filters, push down the filter within the calculation model 128, and/or remove unnecessary attributes from the calculation model 128. In operation 410, the model converter 130 converts the format of the calculation model 128 to the format compatible with the SQL engine 110, thereby producing the converted calculation model 132. In some examples, the model converter 130 converts the format of the calculation model 128 to the QO-graph. Then, the calculation engine 122 is configured to provide the converted calculation model 132 (which is the QO-Graph) to the SQL optimizer 112.

In operation 412, during second compilation operations, the SQL optimizer 112 integrates the converted calculation model 132 into the overall execution plan 114. The SQL optimizer 112 is configured to join the converted calculation model 132 with other query plans such as the SQL model 116 to obtain the execution plan 114, where the execution plan 114 has a merged structure (e.g., SQL-QO structure). The SQL may perform one or more additional optimizations on the combined execution plan 114. In operation 414, the SQL optimizer 112 may store the combined execution plan 114 in the plan cache 120 to be available for subsequent, similar query. In operation 312, the SQL optimizer 112 may execute the execution plan 114, and obtain the appropriate query results based on the retrieved information from the database 134.

Figure 5:
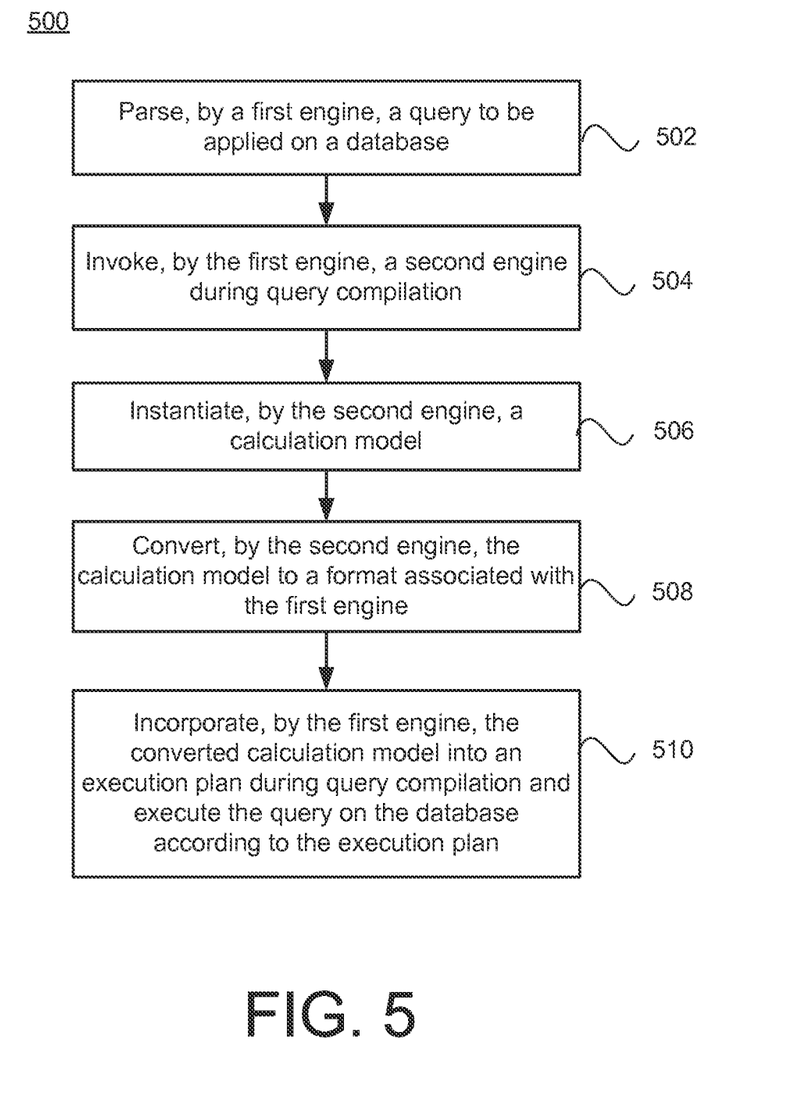
FIG. 5 is a flowchart illustrating example operations of the database system of FIG. 1 according to an aspect.

FIG. 5 is a flowchart illustrating example operations of the database system 100 according to an aspect. Although FIG. 5 is illustrated as a sequential, ordered listing of operations, it will be appreciated that some or all of the operations may occur in a different order, or in parallel, or iteratively, or may overlap in time.

A query to be applied on a database may be parsed by a first engine (502). In some examples, the first engine is an SQL engine, and the second engine is a calculation engine. In some examples, the SQL engine 110 is configured to parse the query to be applied on the database 134.

A second engine may be invoked by the first engine during query compilation (504). In some examples, during query compilation (immediately proceeding the parsing), the first engine is configured to determine whether the query requires any operations to be performed by the second engine. In some examples, during query compilation, the SQL engine 110 is configured to invoke the calculation engine 122. In some examples, the SQL engine 110 is configured to invoke the calculation engine 122 if the calculation model 128 is convertible to the format of the SQL optimizer 112. In some examples, the SQL engine 110 is configured to determine whether the calculation model 128 is fully relational, and if the calculation model 128 is fully relational, the SQL engine 110 is configured to invoke the calculation engine 122.

A calculation model may be instantiated by the second engine (506). For example, in response to the invoking, the second engine may instantiate a calculation model for executing the query. In some examples, the calculation engine 122 (model instantiator 126) is configured to obtain or derive the calculation model 128, and merge the query with the calculation model 128. In some examples, the calculation engine 122 is configured to remove one or more attributes from the calculation model 128 that are not required by the query. Also, after instantiation, the calculation engine optimizer 127 is configured to optimize the calculation model 128.

The calculation may be converted by the second engine to a format associated with the first engine (508). For example, the second engine is configured to convert the format of the calculation model 128 to a format that is compatible with the first engine. In some examples, the model converter 130 of the calculation engine 122 is configured to convert the calculation model 128 into a format compatible with the SQL optimizer 112. In some examples, the format of the calculation model 128 is a directed acyclic graph (DAG). In some examples, the format compatible with the SQL engine 110 is a QO-Graph such that the DAG is converted into the QO-Graph.

The converted calculation model may be incorporated into an execution plan during query compilation, and the query may be executed on the database according to the execution plan (510). In some examples, the first engine may be configured to incorporate the converted calculation model into the execution plan during query compilation, and the first engine is configured to execute the query on the database according to the execution plan. For instance, the compilation process may be resumed after receiving the converted calculation model. In some examples, the SQL engine 110 may be configured to incorporate the converted calculation model 132 into the execution plan 114. Also, the SQL engine 110 may be configured to execute the query on the database 134 according to the execution plan 114.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A database system for converting and integrating calculation models into execution plans, the database system comprising:
   at least one processor;
   a non-transitory computer-readable medium configured to store executable instructions that when executed by the at least one processor are configured to implement:
   a structured query language (SQL) engine configured to parse a query to be applied on a relational database, and obtain an SQL model having a first format, the SQL engine configured to invoke a calculation engine to obtain a calculation model, the calculation model having a second format not compatible with the SQL engine,
   the calculation engine configured to convert, during query compilation and before execution, the second format of the calculation model to the first format that is compatible with the SQL engine,
   the SQL engine configured to incorporate, during query compilation and before execution, the converted calculation model into an execution plan, the execution plan also having the SQL model,
   the SQL engine configured to optimize the execution plan having both the converted calculation model and the SQL model by reordering join operators and pushing an aggregation operator downstream in the execution plan,
   the SQL engine configured to execute the query on the relational database according to the optimized execution plan.

2. The database system of claim 1, wherein the SQL engine is configured to determine whether or not the calculation model includes at least one non-relational operator, and the calculation engine is configured to convert the second format of the calculation model to the first format in response to the determination that the calculation model does not include the at least one non-relational operator.

3. The database system of claim 1, wherein, before converting, the calculation engine is configured to instantiate the calculation model by merging the query with the calculation model and removing one or more attributes from the calculation model that are not required by the query.

4. The database system of claim 1, wherein the second format of the calculation model is a directed acyclic graph (DAG), the DAG being a format not compatible with the SQL engine.

5. The database system of claim 1, wherein the first format is a Query Optimization (QO) graph that is compatible with the SQL engine.

6. The database system of claim 1, wherein the calculation model includes a plurality of operators within the second format, wherein one of the plurality of operators is converted to two or more operators in the first format.

7. The database system of claim 2, wherein, in response to the determination that the calculation model includes the at least one non-relational operator, the calculation model is not converted, but rather the calculation engine is configured to execute the calculation model to obtain intermediate results, and the SQL engine is configured to combine the intermediate results with the SQL model for further execution by the SQL engine.

8. The database system of claim 1, wherein the converted calculation model is joined with the SQL model within the execution plan.

9. The database system of claim 1, wherein the query specifies a calculation view that incorporates an attribute view, the SQL engine configured to obtain the SQL model for the attribute view, the SQL engine configured to invoke the calculation engine to obtain the calculation model for the calculation view, the execution plan integrating both the SQL model and the converted calculation model such that the calculation model is not separately executed to obtain intermediate results.

10. A computer program product tangibly embodied on a non-transitory computer-readable storage medium and including executable code that, when executed, is configured to cause at least one processor to:
 parse, by a structured query language (SQL) engine, a query to be executed on a relational database;
 obtain, by the SQL engine, an SQL model having a first format;
 invoke, by the SQL engine, a calculation engine to obtain a calculation model, the calculation model having a second format that is not compatible with the SQL engine;
 determine, by the SQL engine, whether or not the calculation model includes at least one non-relational operator;
 convert, by the calculation engine, during query compilation and before execution, the second format of the calculation model to the first format in response to the determination that the calculation model does not include the at least one non-relational operator, the first format being compatible with the SQL engine;
 incorporate, by the SQL engine, during query compilation and before execution, the converted calculation model into an execution plan, the converted calculation model being joined with the SQL model within the execution plan;
 optimize, by the SQL engine, the execution plan having the converted calculation model joined with the SQL model including reordering join operators, and pushing an aggregation operator downstream in the execution plan; and
 execute, by the SQL engine, the query on the relational database according to the execution plan.

11. The computer program product of claim 10, wherein the executable code includes instructions that, when executed by the at least one processor, are configured to:
 instantiate, by the calculation engine, the calculation model by merging the query with the calculation model and removing one or more attributes from the calculation model that are not required by the query; and
 optimize, by the calculation engine, the calculation model before converting the second format of the calculation model to the first format.

12. The computer program product of claim 10, wherein the second format is a directed acyclic graph (DAG), and the first format is a Query Optimization (QO) graph, wherein the executable code to convert the second format of the calculation model to the first format includes instructions to convert the DAG to the QO graph.

13. The computer program product of claim 10, wherein, in response to the determination that the calculation model includes the at least one non-relational operator, the calculation model is not converted, but rather is executed to obtain intermediate results, and the intermediate results are combined with the SQL model for further execution by the SQL engine.

14. The computer program product of claim 10, wherein the calculation model includes a plurality of operators within the second format, wherein one of the plurality of operators is converted to two or more operators in the first format.

15. A method for converting and integrating calculation models into execution plans, the method being performed by at least one processor, the method comprising:
 parsing, by a structured query language (SQL) engine, a query to be executed on a relational database, the query requiring a calculation model and an SQL model, the SQL model having a first format, the calculation model having a second format not compatible with the SQL engine;
 determining, by the SQL engine, whether the calculation model is convertible into the first format by determining whether or not the calculation model includes at least one non-relational operator;
 converting, by a calculation engine, during query compilation and before execution, the second format of the calculation model to the first format in response to the determination that the calculation model does not include the at least one non-relational operator;
 integrating, by the SQL engine, during query compilation and before execution, the converted calculation model and the SQL model into an execution plan;
 optimizing, by the SQL engine, the execution plan including reordering join operators, and pushing an aggregation operator downstream in the execution plan; and
 executing, by the SQL engine, the query on the relational database according to the execution plan.

16. The method of claim 15, wherein, in response to the determination that the calculation model includes the at least one non-relational operator, the calculation model is not converted, but rather is executed to obtain intermediate results, and the intermediate results are combined with the SQL model for further execution by the SQL engine.

17. The method of claim 15, wherein the second format is a directed acyclic graph (DAG), and the first format is a Query Optimization (QO) graph, wherein the converting includes converting the DAG to the QO graph.

18. The method of claim 15, wherein the calculation model provides a graphical calculation view that incorporates at least one an attribute or analytical view.

* * * * *